United States Patent [19]

Ekins et al.

[11] 4,243,880
[45] Jan. 6, 1981

[54] METHOD FOR MEASURING TIME DETERMINATION IN A RADIATION MEASURING INSTRUMENT

[75] Inventors: Roger P. Ekins, Dorking, England; Erkki Soini, Turku, Finland

[73] Assignee: LKB-Produkter AB, Bromma, Sweden

[21] Appl. No.: 870,571

[22] Filed: Jan. 18, 1978

[51] Int. Cl.² .................. G01D 18/00; G01T 1/00; G01T 1/20
[52] U.S. Cl. .................. 250/252; 250/328; 250/364
[58] Field of Search .......... 250/252, 336, 393, 395, 250/374, 375, 361, 362, 364, 328; 328/129; 324/78 D; 364/554

[56] References Cited

U.S. PATENT DOCUMENTS

| 3,486,007 | 12/1969 | Jacobson | 324/78 D |
| 3,553,728 | 1/1971 | Frank et al. | 324/78 D |
| 3,729,677 | 4/1973 | Band | 324/78 D |
| 4,133,039 | 1/1979 | Eichenlaub | 250/336 |

FOREIGN PATENT DOCUMENTS 2296314  7/1976  France ........................ 250/336

Primary Examiner—Alfred E. Smith
Assistant Examiner—Carolyn E. Fields
Attorney, Agent, or Firm—Fisher, Christen & Sabol

[57] ABSTRACT

In an instrument for measuring radioactivity, the total measuring time for each sample is optimized by considering the maximum acceptable total counting error as well as the count rate. Each sample is counted for a period of time that is considerably shorter than the required measuring time but long enough to estimate the average pulse frequency, then the measuring time is determined as a function of the estimated pulse frequency and of the experimental error as determined by the channels ratio method.

3 Claims, 1 Drawing Figure

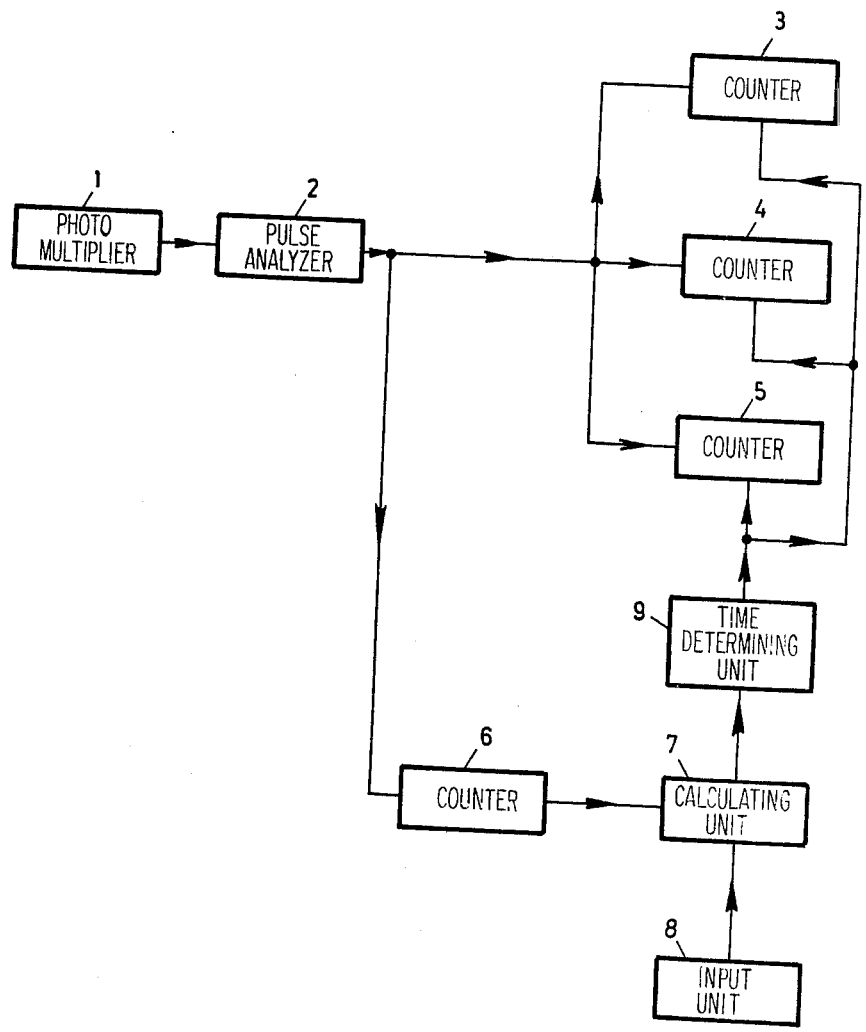

METHOD FOR MEASURING TIME DETERMINATION IN A RADIATION MEASURING INSTRUMENT

The present invention refers to a method for determining the total measuring time for each sample in an instrument for determining the radiation from radioactive samples where the disintegrations are registered as electrical pulses.

In radio isotope measurements with e.g. scintillation counting (including liquid scintillation counting) the statistical precision of results is dependent on the total number of pulses counted. This is based on the fact that the nuclear disintegration is a randomly occuring phenomenon, which follows the Poisson distribution law. Therefore the counting time or maximum number of counts is normally selected in advance in order to determine the statistical precision required.

In some applications the statistical precision of the final result of analysis is not dependent on the number of counts registered only, but there are additional factors which will influence the precision. Examples of such cases are given below. In these cases the statistical precision of analytical results is affected by a standard curve, including either instrument calibration or measurement calibration or both. Mathematical analysis of these cases shows that the choice of counting time or maximum number of counts as a means of a desired statistical precision for a particular counting rate is not the same as the optimal counting time or number of counts to give a desired precision for the final result of the measurement. Therefore counting parameters based on the statistics of raw data only, often result in unnecessarily long counting times and thus lower effectiveness of instrument time.

It is an object of the present invention to provide a method in a radiation measuring instrument where the total measuring time for each sample is made as short as possible considering the required precision in the measuring result.

The invention will now be described in detail reference being made to FIG. 1 which schematically shows a radiation measuring instrument where the method according to the invention is applied. In order to explain the spirit of the invention a brief summary will first be made of the error sources which are the present in isotope measurements and the relation between the sources.

When counting a sample in either a gamma or a liquid scintillation counter, there are inevitable counting errors which arise from the statistical nature of radioactive decay. However the counting error only comprises part of the total overall error in a complete experimental process in which other errors arise (these are usually much more significant), e.g. in sample preparation. Although the errors can be combined arithmetically to obtain the total error, it is more usual to combine them geometrically so that:

$$(\text{TOTAL ERROR})^2 = (\text{COUNT ERROR})^2 + (\text{EXPERIMENTAL ERROR})^2 \quad (1)$$
$$\Delta T^2 = \Delta C^2 + \Delta D^2$$

It becomes clear from this relation that if either of the terms on the right hand side of the equation is very large in comparison with the other, the total error will be almost entirely composed of errors due to the larger protion. It will often be the case that the counting error is much less than the other experimental errors: when this is so, there is clearly no point in counting for long periods of time to reduce the counting error. if some value f can be set for the maximum acceptable total error (this might be in the form of the total error not being greater than $1.5 \times$ the experimental error as an example), it is then possible to optimise the counting process so that just sufficient counts are recorded for this value to be achieved. If this optimised approach to counting is adopted, it is in principle possible to reduce the overall amount of counts (or count time) required in counting a series of samples so that the best possible use is made of instrument time.

As an example of this, consider the table shown below, and assume that the criterion for the total error has been set so that it does not exceed the experimental error multiplied by $f=1.5$. The counting error is assumed to be the standard deviation of the count i.e. $1/\sqrt{Nt}$, $N=$ count rate per min, $t=$ total counting time.

TABLE

| Total Count $N \cdot t$ | Count Error C | Exptl Error D | Total Error T | Exptl Error D | Total Error T | Exptl Error D | Total Error T |
|---|---|---|---|---|---|---|---|
| 10 000 | 1% | 1% | 1.4% | 3% | 3.1% | 10% | 10% |
| 2 000 | 2.2% | 1% | 2.4% | 3% | 3.7% | 10% | 10.2% |
| 1 000 | 3.1% | 1% | 2.4% | 3% | 4.3% | 10% | 10.5% |
| 400 | 5% | 1% | 5.1% | 3% | 5.8% | 10% | 11.2% |
| 200 | 7% | 1% | 7.1% | 3% | 7.6% | 10% | 12.2% |
| 100 | 10% | 1% | 10% | 3% | 10.4% | 10% | 14.1% |

It is clear from this table that there is a large difference in the total count required to satisfy the condition that the total error does not exceed the $1.5 \times$ the experimental error: when the experimental error is 1%, approximately 10,000 counts are required, when the experimental error is 3%, approximately 1,000 counts are required, and when the experimental error is 10%, approximately 100 counts only are required. Obviously there can be very large savings in count time.

The experimental error relationship must be found for a particular measurement in order to determine the optimal counting time. This relationship may be expressed as a discrete function or a histogram of response, concentration, or count rate. The determination of this function can be made empirically, taking a large number of standard samples and finding the empirical value of deviation for each point.

The optimal counting time is obtained from equation (1) by substituting $$\Delta T = f \Delta D \text{ where } f \text{ is a chosen factor (usually in the order of 1.5)} \quad (2)$$

and

-continued $$\Delta C = \frac{1}{\sqrt{Nt}} \text{ where } t \text{ is counting time and } N \text{ is count rate (cpm)} \quad (3)$$

counting time is given by $$t = \frac{1}{(f^2 - 1)\Delta D \cdot N} = \frac{1}{K_1 N} \quad (4)$$

where t is the required counting time for a sample having the count rate N and where the total error is f times bigger than the experimental error. Hence it is necessary to make the first approximation of count rate N and to calculate the error $\Delta D$ from the error histogram or error function for obtaining the optimal counting time.

By solving equations 1–3, the following result is obtained $$K_1 = (f^2 - 1)\Delta D^2.$$

In the drawing there is schematically shown a radiation measurement instrument where the above designed relation for an optimization of the counting time can be applied. Reference numeral 1 denotes a detector e.g. a photo multiplier for registering the scintillation obtained from a disintegration. Reference 2 denotes a pulse analyzer which supplies the pulses to different counters 3, 4 and 5 in dependence of the amplitude of the pulses obtained. All the pulses obtained are furthermore counted in an additional counter 6 connected to a calculating unit 7 which is programmed from an input unit 8 with the necessary input data, i.e. the magnitude of the experimental error and the size of the above discussed parameter f. The unit 7 then controls a time determining unit 9, the output signal of which determines the extension of the counting time for pulses in the units 3, 4 and 5. The device hitherto described operates in the following way. As soon as a time period corresponding to the approximate period time for the incoming pulse frequency has elapsed, the number of pulses registered during this period in the counter 6 are supplied to the calculating unit 7 where-after, in this unit with the aid of the parameters obtained from the unit 8, a calculation in accordance with equation (4) above for the required measuring time is made, this measuring time being transferred to the unit 9, the output value of which determines the period of time during which pulses are supplied to the counters 3, 4 and 5. This period of time is then a first approximation of the total counting time. It is however obvious that from this first estimation of the pulse frequency a considerable error can be obtained and therefore a new value from the units 6 is supplied to the calculating unit 7 as soon as a new period of time as defined above have elapsed, whereafter a somewhat more accurate determination of the measuring time can be made and this procedure is repeated until the time given in the unit 9 has elapsed since the measurement was initiated.

The above described method is applied when the experimental error is determined in advance a large number of samples. However in liquid scintillation counting one often has the case where the experimental error varies from sample to sample whereby in order to make compensation for this, one has to make a calibration for each specific sample, which e.g. could be made in such a way that the radiation from a standard radiation source is measured before each specific sample measurement. If one assumes that for each sample determination comprising a measuring of the standard source, as well as a measurement for the specific sample, a certain maximum time $t_0$ can be used it is essential that this time is split between the measurement of the standard source and the sample in an optimal way. In order to make this time split the above discussed principle could be applied in the following manner.

The statistical precision of the measured absolute activity of the sample is influenced by both the sample pulse rate N and the standard source pulse rate $S_3$ and $S_4$. This relationship is expressed by the formula $$\frac{\Delta A}{A} = \sqrt{\frac{1}{tN} + \left(\frac{ar}{ar+b}\right)^2 \left(\frac{1}{S_3} + \frac{1}{S_4}\right) \frac{1}{t_s}}$$

where
t = counting time of the sample
$t_s$ = standardization time = $t_0 - t$
$t_0$ = total time for a sample plus standard source
a,b = calibration parameters
r = channels ratio is the ratio between the pulse frequencies obtained from the standard source at the two standardization channels
A = absolute activity of sample The optimal counting time can be obtained from the first derivate of this formula.

$$\frac{d}{dt}\left(\frac{A}{A}\right) = 0 \text{ from which}$$

$$t = \frac{1 - \sqrt{FN}}{1 - FN} t_0 \text{ where}$$

$$F = \left(\frac{ar}{ar+b}\right)\left(\frac{1}{S_3} + \frac{1}{S_4}\right)$$

Therefore it is evident that a optimal ratio $t/t_0$ can be found for each particular sample and thus highest precision will be obtained within the total counting time $t_0$.

In certain cases it might be necessary to optimize the counting time for the sample as well as the standardization measuring time. In these cases the counting time t according to equation (4) above and the standardization measurment time $t_s$ is optimized in relation to the total time available. The time for the standardization measurement is then calculated according to the following formula:

$$t_s = \frac{\sqrt{FN} - FN}{1 - \sqrt{FN}} t$$

where F is a constant.

We claim:
1. Method for determining the total measuring time t necessary for measuring the radiation from a specific radioactive sample with an instrument which registers the electrical pulses produced by radioactive decay of a sample, comprising the steps of:
   counting said electrical pulses for a period of time considerably shorter than the measuring time required but long enough to register a number of pulses for estimating the time t;
   Calibrating the instrument which registers the pulse by the channels ratio method using two channels of a standard radiation source to obtain the experimental error, and;

Obtaining a value for time t as a function of the member of pulses from the count produced by the samples and as a function of the experimental error.

2. Method according to claim 1, characterized in, that the total measuring time is determined as $$t = \frac{1}{K_1 \cdot N}$$

where the $K_1$ is an constant and N is the count rate, $K_1$ being equal to $(f^2-1)\Delta D$, where f is a chosen factor and $\Delta D$ is the experimental error.

3. Method according to claim 1 characterized in, that the measuring time is determined as $$t = \frac{1 - \sqrt{FN}}{1 - FN} t_0$$

where F and $t_0$ are constants $$F = \left(\frac{ar}{ar + b}\right)^2 \left(\frac{1}{S_3} + \frac{1}{S_4}\right)$$

where
- $t_0$ = measuring time of a sample + measuring time of a standard
- a, b = calibration parameters
- r = ratio between pulse frequencies obtained from the standard source at two standardization channels
- $S_3$, $S_4$ = pulse rate of the standard source.

* * * * *

UNITED STATES PATENT OFFICE
CERTIFICATE OF CORRECTION

Patent No. 4,243,880            Dated January 6, 1981

Inventor(s)      Ekins et al

It is certified that error appears in the above-identified patent and that said Letters Patent are hereby corrected as shown below:

On the face of the patent, please enter the following:

[30] Foreign Application Priority Data

January 19, 1977   Sweden ....... 7700511

Signed and Sealed this

Tenth Day of March 1981

[SEAL]

Attest:

RENE D. TEGTMEYER

Attesting Officer      Acting Commissioner of Patents and Trademarks